UNITED STATES PATENT OFFICE.

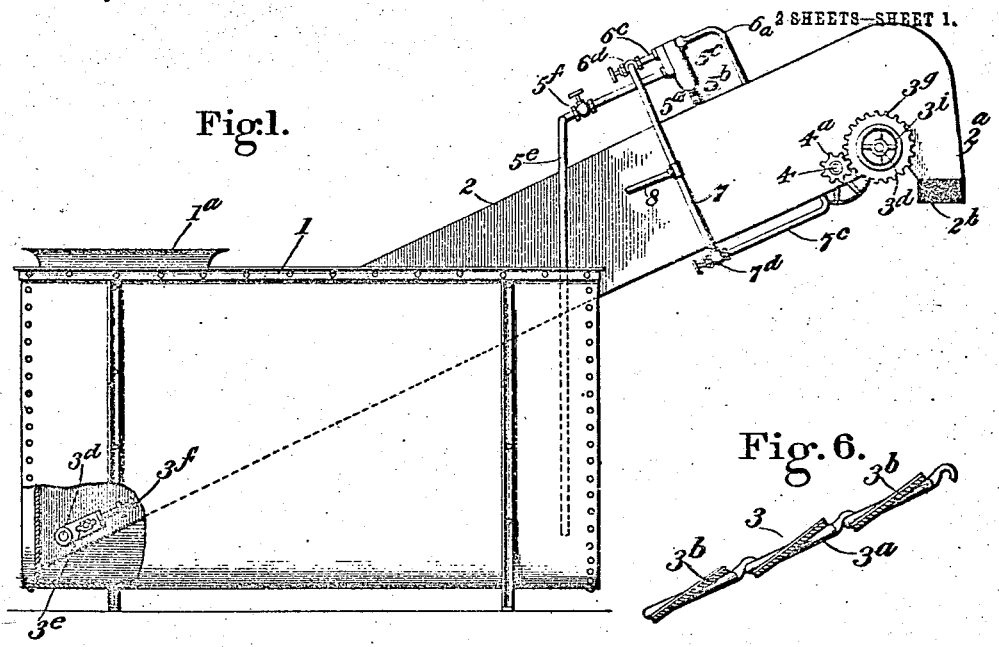
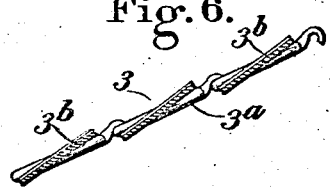
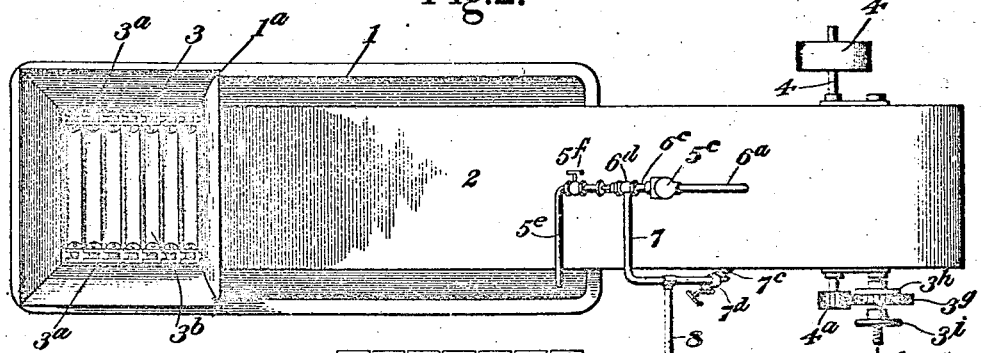
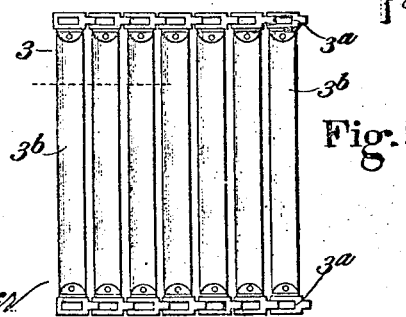

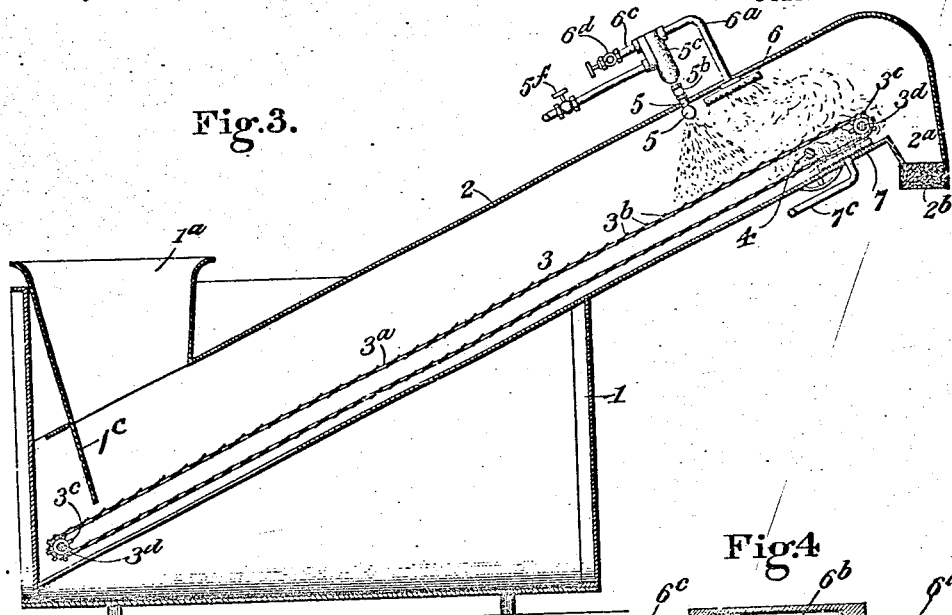
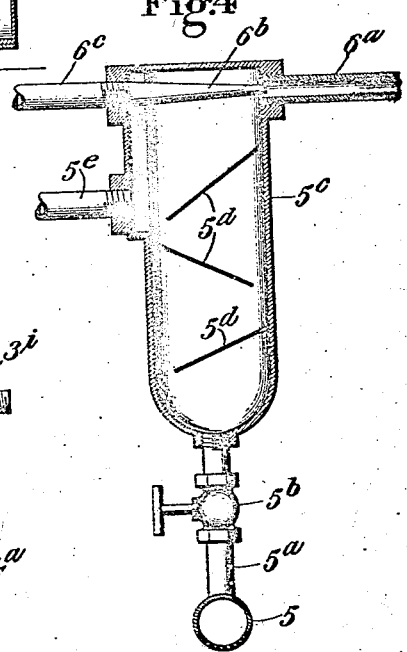
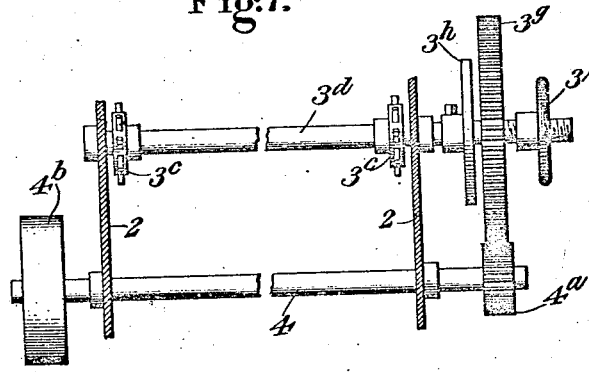

PAUL STANLEY BAKER AND OWEN ELSWORTH VANCE, OF MUSCATINE, IOWA.

MACHINE FOR WASHING AND SCALDING FRUITS, &c.

No. 898,954.

Specification of Letters Patent.

Patented Sept. 15, 1908.

Application filed October 22, 1907. Serial No. 398,563.

*To all whom it may concern:*

Be it known that we, PAUL S. BAKER and OWEN E. VANCE, citizens of the United States, and both residing at Muscatine, Muscatine county, and State of Iowa, have invented certain new and useful Improvements in Machines for Washing and Scalding Fruits, &c.; and we hereby declare that the following is a full, clear, and exact description thereof, reference being had to the accompanying drawings, which form part of this specification.

Our invention is an improvement in machines for washing and scalding fruits, vegetables and the like, and is particularly designed for preparing tomatoes for canning.

Our object is to provide a machine wherein the fruit may be first soaked in cold water, then removed and subjected to the action of a washing spray of water, and then to the action of steam jets directed thereagainst, so as to scald the fruit and loosen or remove the skin thereof, and finally be discharged into suitable receivers.

The invention will be clearly understood from the following explanation of the machine illustrated in the accompanying drawings, which show the present preferred embodiment of the invention, and we refer to the claims following the description for summaries of the parts and combination of parts for which protection is desired.

In said drawings—Figure 1 is a side elevation of the complete machine. Fig. 2 is a plan view thereof. Fig. 3 is a vertical central section thereof. Fig. 4 is an enlarged sectional view through the water jet head. Figs. 5 and 6 are enlarged detail views of the carrier. Fig. 7 is an enlarged transverse sectional view of the carrier operating devices.

The machine comprises a tank 1, preferably constructed of metal and of considerable capacity, and adapted to contain cold water. Arranged at an incline in this tank, and extending diagonally in and out at one end thereof, is a trunk 2 which communicates at its lower end, on its upper side, with a hopper $1^a$ in the tank, and has a discharge spout or mouth $2^a$ at its upper end, which can be provided with a textile or flexible bag closure $2^b$, permitting escape of material falling thereinto, while keeping the trunk substantially closed.

The opening in the lower end of trunk 2 is sealed by the water in tank 1, and the fruit dumped into the hopper is soaked in the water and the dirt thereon loosened before the fruit is elevated in the trunk by the carrier 3. Said carrier consists of parallel endless chains $3^a$, connected by slats $3^b$, said chains running over sprockets $3^c$ on shafts $3^d$, at the opposite ends of the trunk, and adjacent the lower side thereof. The lower shaft $3^d$ is preferably journaled in slides $3^e$ attached to the sides of the trunk, and adjustable by means of bolts $3^f$ as shown in Fig. 1, so that the carrier can be properly tensioned, to insure its proper working.

The slats $3^b$ of the carrier are preferably arranged on overlapping angles, as shown in Fig. 6, so that the forward edge of one slat on the upper run of the carrier, will act as a stop for the fruit on the preceding strap, while water can freely drain from the fruit between the slats.

One end of the upper shaft $3^d$ extends through the side of the trunk, and carries a loose pinion $3^g$, interposed between a disk $3^h$ fixed on the shaft, and a hand-nut $3^i$ screwed on the outer end of the shaft. By turning nut $3^i$ the pinion $3^g$ can be frictionally clamped between the nut and disk with any desired pressure, so as to move the carrier at any desired speed. Pinion $3^g$ meshes with a small pinion $4^a$ on a shaft 4 journaled in and transversely of the trunk, adjacent to shaft $3^d$, and carrying a pulley $4^b$ which can be belted to any suitable driver, (not shown).

Located in the trunk above the carrier, and beyond tank 1, is a washing water jet or spray pipe 5, which is connected by a pipe $5^a$ provided with a valve $5^b$, with an inspirator $5^c$, to which is connected a suction pipe $5^e$ extending into the tank 1 and below the water level therein, so as to supply the inspirator with water. Suction is created in the inspirator, so as to draw water thereinto from the tank, by means of a steam pipe $6^c$ having a nozzle $6^b$ entering the end of a pipe $6^a$ connected with the upper part of the inspirator $5^c$, pipe $6^a$ connecting with a steam spray pipe or nozzle 6 within the trunk 2, and beyond the water spray 5. When steam is turned into pipe $6^c$ it flows into pipe $6^b$ and creates a suction in the inspirator $5^c$, drawing water thereinto through pipe $5^e$, and when the inspirator about fills with water, cock $5^b$ is opened and the water flows into the trunk through spray head 5, and the steam enters the trunk through spray head 6.

The inspirator 5ᶜ may be provided with deflecting plates 5ᵈ, tending to prevent water being withdrawn into pipe 6ᵃ when valve 5ᵇ is opened. Steam is also admitted into the bottom of the trunk at a point preferably slightly beyond the upper steam spray, by means of a pipe 7ᶜ connecting with a steam spray pipe 7, as shown. Both steam pipes 6ᶜ, 7ᶜ, may connect with a common steam supply pipe 8, to which steam is supplied from any suitable producer (not shown.) The steam sprays 6 and 7 may be of any desired construction; and one will deliver steam forcibly downward into and against a mass of fruit on the ascending side of the carrier,— while the other will deliver steam forcibly upward into the ascending fruit. The pipes 5ᵉ, 6ᶜ and 7ᶜ, may be provided with valves 5ᶠ, 6ᵈ, 7ᵈ, to regulate the amount of steam admitted therethrough.

Operation. The tank 1 being filled with water to the desired level, a lot of the fruit, such as tomatoes, is dumped into the hopper, and descends through the water in the tank onto the carrier 3. The fruit is prevented from dropping off the carrier by the end plate 1ᶜ and sides of hopper and trunk. Then steam is admitted into pipe 6ᶜ, (valve 5ᵇ being closed and valve 5ᶠ opened), until water appears in the inspirator,—then valve 5ᵇ is opened, and the water flows in a continuous stream into the trunk through spray head 5, while steam flows in through spray head 6. Then steam is admitted into spray head 7, and the carrier started. The fruit is carried up in layers upon the upper run of the carrier, and after leaving the tank it passes first under the washing spray 5 and is thoroughly cleansed. Then it passes successively under the steam spray 6 and over the steam spray 7 and is thoroughly scalded,—and is finally discharged through the mouth 2ᵃ of the trunk. The washing water and condensed steam runs back through the trunk into the tank and replenishes the water supply therein. Fresh fruit may be constantly supplied to the hopper, and the machine operated continuously as long as any fruit remains to be cleaned and scalded.

Having described our invention what we claim as new and desire to secure by Letters Patent is:

1. In combination, a tank, a trunk connected therewith, an endless carrier for removing fruit from the tank through the trunk, a water spray in the trunk beyond the tank, a steam spray in the trunk beyond the water spray, both said sprays discharging onto the carrier below the upper end thereof, an inspirator connected with the water spray and with the tank to supply the spray from the tank, and means for passing steam through said inspirator to the steam spray.

2. In combination, a tank, a trunk connected therewith, a carrier for removing fruit from the tank through the trunk, a water spray in the trunk beyond the tank, a steam spray in the trunk beyond the water spray, both said sprays discharging onto the carrier below the upper end thereof, and a second steam spray below the carrier in advance of the first steam spray; with an inspirator connected with the water spray and with the tank to supply the spray from the tank, and means for passing steam through said inspirator to one of the steam sprays, substantially as described.

3. In combination, a tank, a trunk extending therefrom, a hopper at the lower end of the trunk, a discharge outlet at its upper end, a carrier in said trunk, and means for moving said carrier; an inspirator, a water pipe connecting said inspirator with the tank; and a water spray in the trunk connected with said inspirator; a steam spray in the trunk connected with the inspirator-head, said steam spray being above the carrier; and a second steam spray arranged below the carrier, said steam sprays being beyond the water spray, substantially as described.

In testimony that we claim the foregoing as our own, we affix our signatures in presence of witnesses.

PAUL STANLEY BAKER.
OWEN ELSWORTH VANCE.

In presence of—
NORMAN E. BAKER,
HENRY JAYNE,
WILLIAM R. JAYNE.